United States Patent
Ferrand et al.

(10) Patent No.: US 10,983,937 B2
(45) Date of Patent: Apr. 20, 2021

(54) METHOD FOR MANAGING ACCESS TO A SHARED BUS AND CORRESPONDING ELECTRONIC DEVICE

(71) Applicants: STMicroelectronics SA, Montrouge (FR); STMICROELECTRONICS (ROUSSET) SAS, Rousset (FR)

(72) Inventors: Olivier Ferrand, Carry le Rouet (FR); Daniel Olson, Marseilles (FR); Anis Ben Said, Tunis (TN); Emmanuel Ardichvili, Valbonne (FR)

(73) Assignees: STMICROELECTRONICS (ROUSSET) SAS, Rousset (FR); STMICROELECTRONICS SA, Montrouge (FR)

(*) Notice: Subject to any disclaimer, the term of this patent is extended or adjusted under 35 U.S.C. 154(b) by 0 days.

(21) Appl. No.: 16/802,116

(22) Filed: Feb. 26, 2020

(65) Prior Publication Data

US 2020/0293474 A1    Sep. 17, 2020

(30) Foreign Application Priority Data

Mar. 11, 2019   (FR) ...................................... 1902455

(51) Int. Cl.
    *G06F 13/364* (2006.01)
    *G06F 13/362* (2006.01)
    *G06F 13/42* (2006.01)

(52) U.S. Cl.
    CPC ........ *G06F 13/364* (2013.01); *G06F 13/3625* (2013.01); *G06F 13/4291* (2013.01)

(58) Field of Classification Search
    CPC . G06F 13/364; G06F 13/3625; G06F 13/4291
    See application file for complete search history.

(56) References Cited

U.S. PATENT DOCUMENTS

| | | | | |
|---|---|---|---|---|
| 5,365,438 A | * | 11/1994 | Mitchell | G01R 31/007 324/380 |
| 5,954,809 A | * | 9/1999 | Riley | G06F 13/368 710/113 |
| 2004/0109688 A1 | * | 6/2004 | Kim | H04Q 11/0067 398/68 |
| 2015/0195357 A1 | * | 7/2015 | More | H04L 67/1097 709/224 |

OTHER PUBLICATIONS

"PCI Local Bus Specification", Revision 3.0, Feb. 3, 2004, 101 pages.

* cited by examiner

*Primary Examiner* — Henry Tsai
*Assistant Examiner* — John B Roche
(74) *Attorney, Agent, or Firm* — Slater Matsil, LLP

(57) ABSTRACT

In accordance with an embodiment, a method for managing access to a bus shared by interfaces includes: when to the bus is granted to one of the interfaces, triggering a counting having a minimum counting period; and when at least one access request to the bus emanating from at least one other of the interfaces is received during the minimum counting period, releasing the access granted to the one of the interfaces, and creating an arbitration point at an end of the minimum counting period.

20 Claims, 4 Drawing Sheets

[Fig 1]
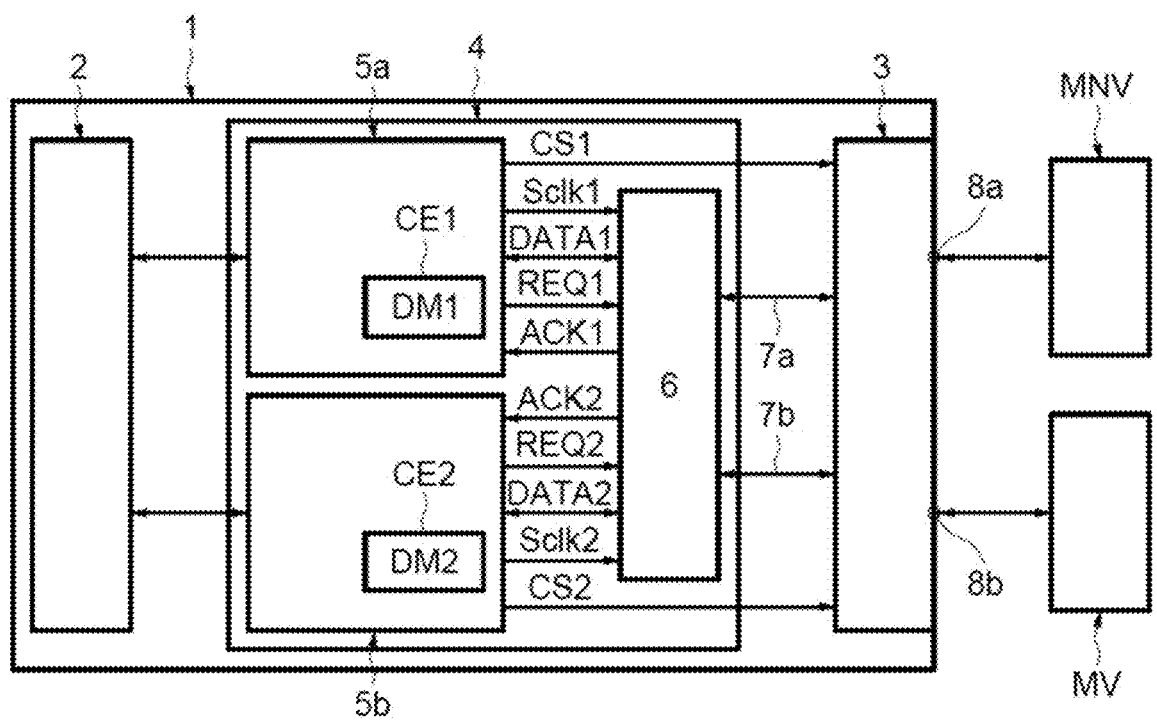

[Fig 2]
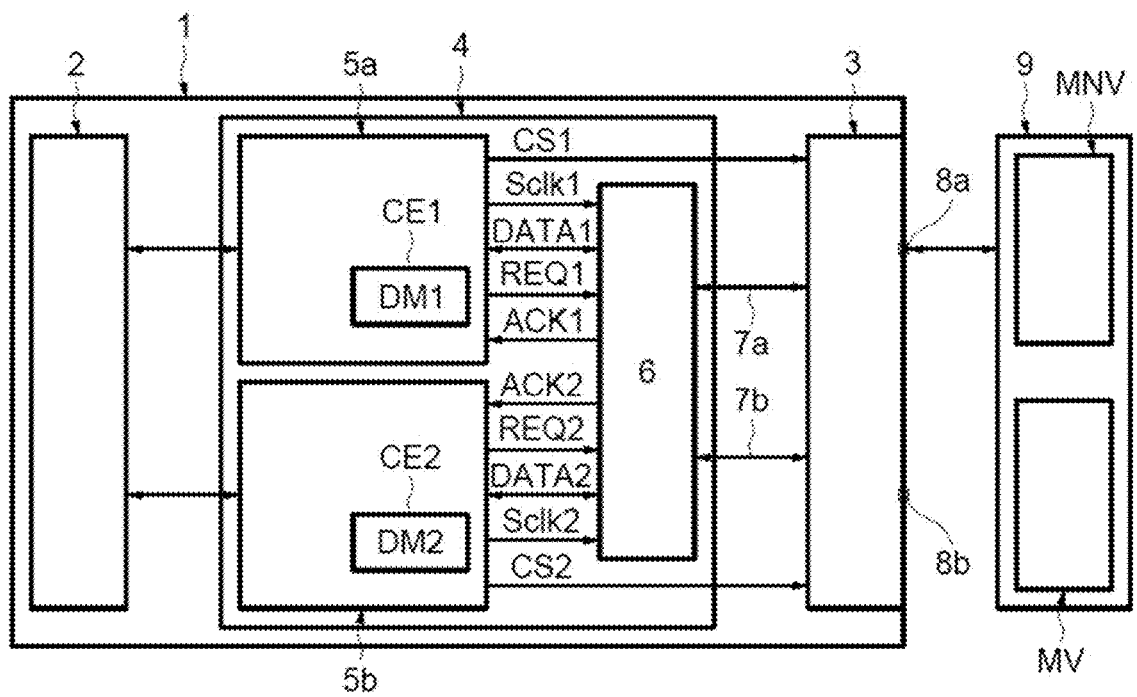

[Fig 3]
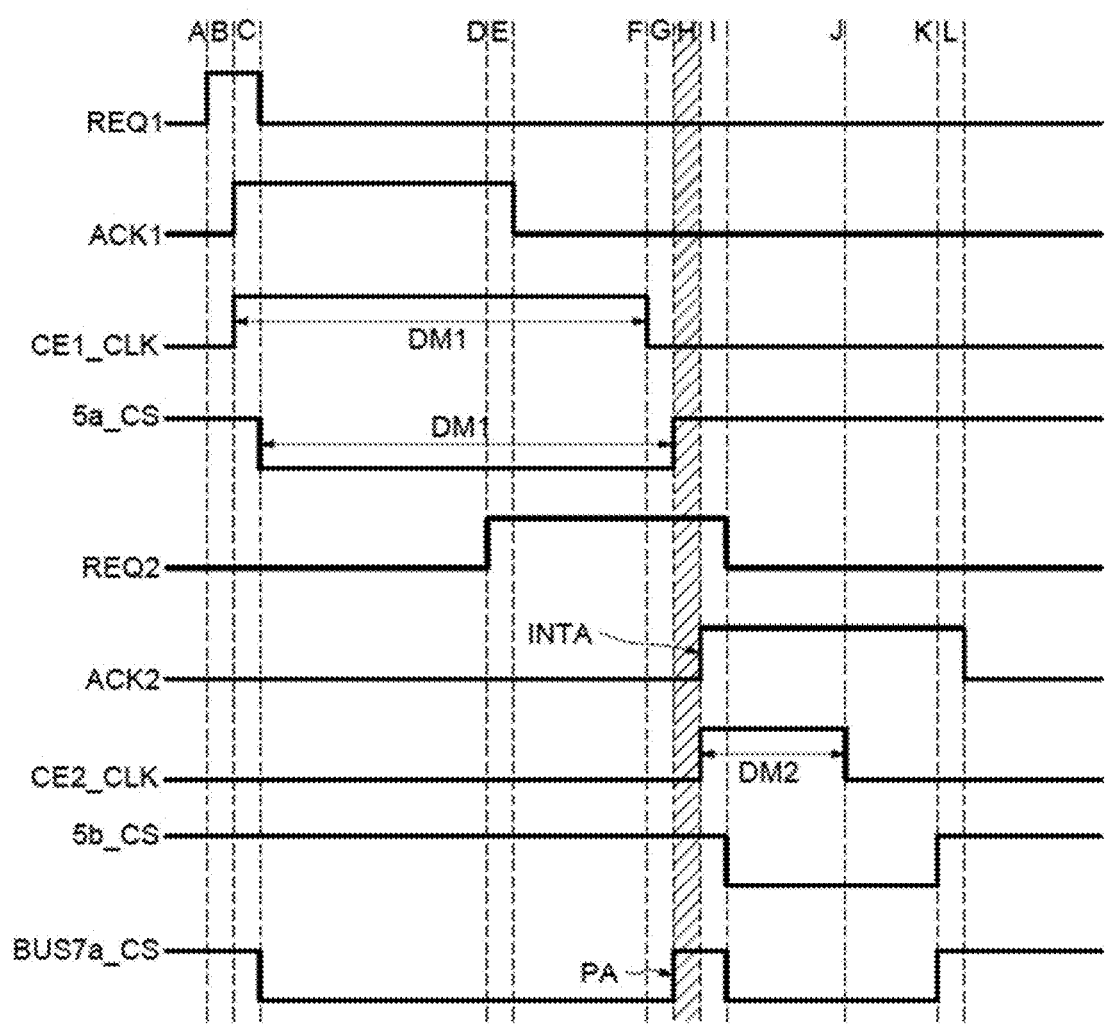

[Fig 4]
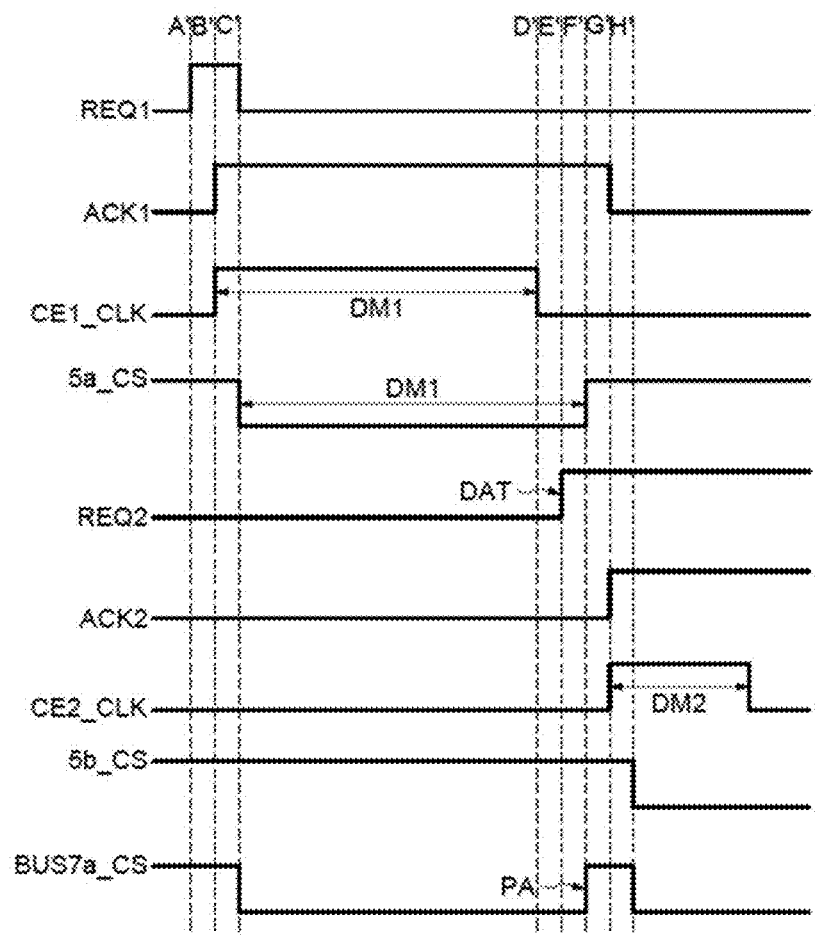

METHOD FOR MANAGING ACCESS TO A SHARED BUS AND CORRESPONDING ELECTRONIC DEVICE

CROSS-REFERENCE TO RELATED APPLICATIONS

This application claims priority to French Patent Application No. 1,902,455, filed on Mar. 11, 2019, which application is hereby incorporated herein by reference in its entirety.

TECHNICAL FIELD

Implementations and embodiments of the invention relate to electronic devices, more particularly to a method for managing access to a shared bus and a corresponding electronic device.

BACKGROUND

In general, when a bus such as a data bus is free, this bus is configured for permitting access to the bus to an interface which has made an access request first received by the bus. Once access is granted to the bus, one or more subsequent access requests emanating from at least one other interface are suspended or denied, until the end of occupation of the access to the bus granted to the interface. In some cases, the bus may be occupied almost permanently, even in bad faith, if the duration of occupation of the access granted to the interface is too long, which is often problematic for real-time applications, e.g. real-time image display applications.

There is a conventional solution which limits the duration of occupation of the access and periodically releases the access granted to the interface for creating arbitration points making it possible to determine another interface to which access to the bus will be granted if other access requests are received in advance of the arbitration points. However, according to this conventional solution, the information interface is forced to release the access granted even if there is no other access request received, which considerably slows the speed of the transaction performed by the interface.

An increase in the duration of occupation of the access proportionally reduces the time spent in the arbitration phases and thus increases the efficiency of the bus. But this strategy generates a longer waiting time (latency) for the other interfaces, while is sometimes unacceptable with regard to real-time constraints of the system. This is why the arbitration points are generally frequent, which greatly reduces the efficiency of the bus.

Thus, there is a need to provide a low complexity technical solution for increasing the efficiency of a bus shared by interfaces while avoiding potential problems for real-time applications.

SUMMARY

In accordance with an embodiment, a method for managing access to a bus shared by interfaces includes: when to the bus is granted to one of the interfaces, triggering a counting having a minimum counting period; and when at least one access request to the bus emanating from at least one other of the interfaces is received during the minimum counting period, releasing the access granted to the one of the interfaces, and creating an arbitration point at an end of the minimum counting period.

In accordance with another embodiment, an electronic device includes interfaces, wherein each interface of the interfaces comprises a counter; a bus shared by the interfaces; and a controller configured to: when access to the bus is granted to one of the interfaces, trigger a counting having a minimum counting period, and when at least one access request to the bus emanating from at least one other of the interfaces is received during the minimum counting period, release the access granted to the one of the interfaces, and create an arbitration point at an end of the minimum counting period.

In accordance with a further embodiment, An electronic apparatus includes a plurality of interface circuits; a bus coupled to each of the plurality of interface circuits; a controller coupled to the bus and to the plurality of interface circuits; and a multiplexer coupled to the controller via the bus, wherein the controller is configured to activate a first timer for a minimum timer period when access to the bus is granted to a first interface circuit of the plurality of interface circuits, and when at least one access request for the bus is received from a second interface circuit of the plurality of interface circuits during the minimum timer period, release the access granted to the first interface circuit and granting access to the second interface circuit at an end of the minimum timer period.

BRIEF DESCRIPTION OF THE DRAWINGS

Other advantages and features of the invention will appear on examining the detailed description of implementations and embodiments, in no way restrictive, and the appended drawings in which:

FIG. 1 schematically illustrates an embodiment of the invention;

FIG. 2 schematically illustrates another embodiment of the invention;

FIG. 3 illustrates an implementation of the invention in a timing diagram; and

FIG. 4 illustrates another implementation of the invention in a timing diagram.

DETAILED DESCRIPTION OF ILLUSTRATIVE EMBODIMENTS

According to one aspect, a method is provided for managing access to a bus by interfaces. This method comprises a triggering, when access to the bus is granted to one of the interfaces, of a counting having a minimum counting period, and a release of the access granted to one of the interfaces and a creation of an arbitration point at the end of the minimum period if at least one access request to the bus emanating from at least one other of the interfaces is received during the minimum counting period.

In other words, once access to a bus is granted to an interface, it will be possible to have an arbitration point for granting access to another interface only after a minimum counting period. This minimum counting period is put in place for ensuring a minimum transaction size of the interface so as to ensure a good efficiency of the bus.

Accordingly, for the at least one other of the interfaces which requests access to the bus, it is sufficient to wait for the minimum counting period to obtain an arbitration point, which advantageously makes it possible to avoid a single interface permanently occupying the access.

According to one implementation, the method further comprises, at the arbitration point, an arbitration of access to one of the at least one bus for the at least one other of the interfaces so as to determine a permitted interface, and an access permission to the bus for the permitted interface as the result of the arbitration.

Advantageously, the interface which will shortly be permitted to access the bus is determined at the arbitration point created following the minimum counting period and all the conventional arbitration mechanisms may be applied for determining the permitted interface.

According to another implementation, the method further comprises a release of the access granted to one of the interfaces and an access permission to the bus for another interface following a late access request to the bus emanating from this other interface if no access request is received during the minimum period and if the late access request is first received following the minimum period.

In an embodiment, an access request is considered late if it occurs after the expiry of the minimum counting period.

Once the minimum counting period has elapsed, the interface which currently occupies the access is ready to release the access imminently after receiving the next access request.

According to another implementation, the method further comprises preserving the access granted to one of the interfaces until the end of occupation of the access if no access request to the bus is received before the end of occupation.

Advantageously, the interface which occupies the access to the bus may keep the access until its end of occupation if no access request is received during the period of occupation of the access, which may considerably increase the efficiency of the bus.

By way of a non-restrictive example, the minimum counting period may be configurable and correspond to one of the interfaces.

In accordance with some embodiments, a minimum counting period is dedicated to a corresponding interface and may be configured to be greater than a period required for transmitting a command and one or more associated addresses on the bus by the interface. The required period, on the other hand, does not include possible data transmissions.

Advantageously, each interface may have a corresponding minimum counting period. Each minimum counting period is configurable so as to precisely balance the use of the bus.

The interfaces may, for example, comprise serial peripheral interfaces (SPI). As a non-restrictive guide, the serial peripheral interfaces may, for example, comprise at least one octal type serial peripheral interface commonly known to the person skilled in the art under the acronym OctoSPI (Octal Serial Peripheral Interface). The bus may, for example, be an input-output data bus. More precisely, this may, for example, be a case where a plurality of peripheral interfaces share a single input-output data bus.

According to another aspect, an electronic device is provided comprising interfaces each comprising a counter, a bus shared by the interfaces, and control means. The control means are configured for triggering, when access to the bus is granted to one of the interfaces, a counting of the counter of one of the interfaces having a minimum counting period, and releasing the access granted to one of the interfaces and creating an arbitration point at the end of the minimum period if at least one access request to the bus emanating from at least one other of the interfaces is received during the minimum counting period.

According to another embodiment, the control means are further configured for performing, at the arbitration point, an arbitration of access to the bus for the at least one other of the interfaces so as to determine a permitted interface, and permitting access to the bus for the permitted interface as the result of the arbitration.

According to another embodiment, the control means are further configured for releasing the access granted to one of the interfaces and permitting access to the bus for another interface following a late access request to the bus emanating from this other interface if no access request is received during the minimum period and if the late access request is first received following the minimum period.

The control means may, for example, be configured for maintaining the access granted to one of the interfaces until the end of occupation of the access if no access request to the bus is received before the end of occupation.

As a non-restrictive guide, the minimum counting period may, for example, be configurable and correspond to one of the interfaces.

The interfaces may, for example, comprise serial peripheral interfaces. The serial peripheral interfaces may, for example, comprise at least one Octal Serial Peripheral Interface. The bus may, for example, be an input-output data bus.

According to yet another aspect, an electronic apparatus is provided, e.g. a system on chip, comprising a device as defined above, and a multiplexing module coupled to the control means.

According to one embodiment, the multiplexing module comprises a set of input-output pins intended to be coupled to memory means comprising a plurality of external memories. According to another embodiment, the multiplexing module comprises as many sets of input-output pins as interfaces and each set of input-output pins is intended to be coupled to an external memory.

Reference 1 in FIG. 1 designates an electronic apparatus, here, for example, a system on chip, commonly known to the person skilled in the art under the acronym SOC.

This system on chip includes a processing unit 2, here, for example, a 32-bit microcontroller; an input-output multiplexing module 3 comprising input-output pins; and an electronic device 4 coupled between the processing unit 2 and the input-output multiplexing module 3. This electronic device 4 includes a plurality of interfaces, here, for example, a first serial peripheral interface 5a and a second serial peripheral interface 5b respectively coupled to the processing unit 2 and configured for bi-directionally communicating commands and data with the processing unit 2; and control means 6 respectively coupled to the first and second interfaces 5a, 5b, and to the input-output multiplexing module 3 via at least one bus, here, for example, a first data bus 7a and a second data bus 7b. In various embodiments, control means 6 may be implemented using a controller having digital control logic that implements the function of control means 6 described herein. This digital control logic may be implemented using specifically configured gate level logic, programmable logic, and/or logical functions implemented by a programmable processor that execute code stored on a non-transitory machine or computer readable medium, such as a memory. In some embodiments, control means 6 is implemented as a digital state machine.

It should be noted that the processing unit 2 operates here as a master with respect to the first and second serial peripheral interfaces 5a, 5b. The system on chip 1 may, for example, comprise other masters such as a graphics processor (Graphics Processing Unit or GPU). For the purpose of simplification, only the processing unit 2 is illustrated in FIG. 1.

These first and second serial peripheral interfaces 5a, 5b are here, for example, octal type serial peripheral interfaces commonly known under the acronym OctoSPI (Octal Serial Peripheral Interface).

Advantageously, these OctoSPI interfaces 5a, 5b may provide up to eight data lines for addressing one or more slaves with respect to the first and second serial peripheral interfaces 5a, 5b, here, for example, a non-volatile memory MNV of the Flash type and a volatile memory MV of the Synchronous Dynamic Random Access Memory or SDRAM type. The first and second OctoSPI interfaces 5a, 5b respectively comprise a first counter CE1 and a second counter CE2.

The first and second counters CE1 and CE2 have a first minimum counting period DM1 and a second minimum counting period DM2 respectively.

These first and second minimum counting periods DM1, DM2 may be identical or different, and are configured to be greater than a period required for transmitting a command and one or more associated addresses on the first or second data bus 7a, 7b via the first and second interface 5a, 5b, without including any possible data transmissions, which advantageously allows the use of the first and second data buses 7a, 7b by the corresponding first and second interfaces 5a, 5b to be precisely balanced.

In order to best meet the need of each interface 5a, 5b, e.g., the need to adequately transmit data in a given period, the first and second minimum counting periods DM1, DM2 are configurable and suited to the corresponding first and second interfaces 5a, 5b.

The input-output multiplexing module 3 is configured for receiving a first selection signal CS1 emanating from the first interface 5a, a second selection signal CS2 emanating from the second interface 5b, and data and clock signals delivered by the first and second interfaces 5a, 5b via the first and second data buses 7a, 7b, and passing the data and clock signals to the various input-output pins according to the configuration of the input-output multiplexing module 3.

In the case illustrated in FIG. 1, the input-output pins here comprise a first set of pins 8a coupled to the non-volatile memory MNV of the Flash type and a second set of pins 8b coupled to the volatile memory of the SDRAM type.

In this configuration illustrated in FIG. 1, the first and second interfaces 5a, 5b may be simultaneously and respectively associated with one of the first and second sets of pins 8a, 8b. Each interface 5a, 5b also comprises a corresponding clock signal Sclk1, Sclk2 so as to time the transaction in the corresponding memory MNV, MV.

The first and second interfaces 5a, 5b are configured for respectively delivering first data DATA1 and second data DATA2 to the control means 6. The first interface 5a is further configured for delivering a first access request signal REQ1 and receiving a first confirmation ("Acknowledgement") signal ACK1 emanating from the control means 6. In the same way, the second interface 5b is further configured for delivering a second access request signal REQ2 and receiving a second confirmation ("Acknowledgement") signal ACK2 emanating from the control means 6.

It should be noted that in the configuration illustrated in FIG. 1, the first and second confirmation signals may, for example, be activated at the same time thanks to the first and second sets of pins 8a, 8b.

As will be seen further in the description, the control means 6 are configured for managing accesses to the data buses 7a, 7b requested by the first and second interfaces 5a, 5b, notably when access to the first or second data bus 7a, 7b has already been granted.

Reference is now made to FIG. 2 for illustrating another configuration of the electronic apparatus 1 in which the input-output multiplexing module 3 is configured for being coupled to the memory means 9, here, for example, a multi-chip memory containing a plurality of memories, here, for example, the non-volatile memory MNV and the volatile memory MV previously illustrated. In this case, only a single set of input-output pins, here, for example, the first set of pins 8a, is used.

The clock signals Sclk1, Sclk2 and the selection signals CS1, CS2 are transmitted via the control means 6 and the control means 6 are configured for determining which clock signal will be transmitted to the memory means 9 either via the first data bus 7a or via the second data bus 7b.

By using the signals REQ1/ACK1/REQ2/ACK2, the control means 6 are configured for dynamically determining which interface, 5a or 5b, is selected. The signals of the selected interface are here, for example, sent via the bus 7a. The bus 7b is therefore not used in this configuration. In other words, the data delivered by the first and second interfaces 5a, 5b cannot be simultaneously transmitted to the memory means 9.

Advantageously, the second set of input-output pins 8b may, thanks to the use of the input-output multiplexing module 3, be used by other external interfaces.

Reference is now made to FIG. 3 for illustrating an implementation of managing access to a data bus, here, for example, the first data bus 7a, performed by the control means 6.

As illustrated in FIG. 3, the first data bus 7a is not occupied, e.g. the signal BUS7a_CS is in a high state, prior to receiving a first access request emanating from the first interface 5a. The signal REQ1 is in a high state at instant A. The control means 6 are configured for granting access to the first data bus 7a to the first interface 5a in the next cycle (ACK1 at instant B illustrated in FIG. 3) and triggering a counting (CE1_clk) having the first minimum counting period DM1. Consequently, the first interface 5a starts the transaction at instant C.

An access request REQ2 to the first data bus 7a emanating from the second interface 5b is received by the control means 6 at instant D, e.g. before the end of the first minimum period DM1.

The signal ACK1 switches into the low state in the next cycle (instant E) but the transaction of the first interface 5a ends at instant G at the end of the first minimum counting period (instant F). In other words, the first interface 5a releases the access to the first data bus 7a at instant G and the control means 6 are configured for creating an arbitration point PA at instant G.

It should be noted that if there are multiple access requests received before the creation of the arbitration point PA, the control means 6 are configured for determining a permitted interface INTA by applying conventional arbitration algorithms known to the person skilled in the art, e.g. according to the order of reception, priority level, or waiting time, etc.

As there is only one access request to be arbitrated here, the control means 6 are therefore configured for granting access to the first data bus 7a to the second interface 5b as the permitted interface INTA at instant H and triggering a counting (CE2_clk) having the second minimum counting period DM2.

The transaction of the second interface 5b starts in the next cycle at instant I.

If no access request emanating from another interface, here the first interface 5a, is received before the end of occupation of the access granted to the second interface 5b, the transaction of the second interface 5b continues and the access granted to the second interface 5b is preserved (or maintained) until the end even if the counting (CE2_clk) having the second minimum counting period DM2 has already ended, namely at instant J.

As can be seen in FIG. 3, the transaction of the second interface 5b has ended at instant K and the signal ACK2 returns to its low state in the next cycle (instant L). The signal BUS7a_CS is in the low state when there is a transaction.

Reference is now made to FIG. 4 for illustrating another implementation of managing access to a data bus, here, for example, still the first data bus 7a.

It should be noted that the examples illustrated in FIGS. 3 and 4 may also be implemented for managing access to the second data bus 7b.

Instants A' to C' are identical to instants A to C illustrated in FIG. 3.

Instant E' at which the first data bus 7a receives an access request emanating from the second interface 5b is after the end of the counting having the first minimum counting period DM1 (instant D'). In other words, the access request emanating from the second interface 5b is here considered to be a late access request DAT.

As the late access request DAT is the first request received following the first minimum counting period DM1 while the transaction of the first interface 5a is still in progress, the first interface 5a is imminently ready to release the access to the first data bus 7a.

Consequently, the control means 6 are configured for stopping the transaction of the first interface 5a at instant F' and the signal ACK1 switches into low state in the next cycle at instant G'.

The control means 6 are further configured for granting access to the first data bus 7a to the second interface 5b at instant G' and triggering a counting (CE2_clk) having the second minimum counting period DM2. The transaction of the second interface 5b starts in the next cycle at instant H'.

Thus, a transaction of an interface will not be interrupted systematically and access to a bus shared by multiple interfaces is managed in a balanced and fair manner while taking into account a minimum counting period dedicated to a corresponding interface.

What is claimed is:

1. A method for managing access to a bus shared by interfaces, the method comprising:
    when access to the bus is granted to one of the interfaces, triggering a counting having a minimum counting period;
    when at least one access request to the bus emanating from at least one other of the interfaces is received during the minimum counting period, releasing the access granted to the one of the interfaces, and creating an arbitration point at an end of the minimum counting period; and
    when no access request is received during the minimum counting period and when a late access request is first received following the minimum counting period,
        releasing the access granted to the one of the interfaces, and
        granting access to the bus for the at least one other of the interfaces following the late access request to the bus emanating from the at least one other interface, wherein the access granted to the one of the interfaces is uninterrupted from before the end of the minimum counting period to the granting of the access for the at least one other of the interfaces following the late access request to the bus.

2. The method according to claim 1, further comprising, at the arbitration point, arbitrating access to the bus for the at least one other of the interfaces to determine a permitted interface, and
    granting access to the bus for the permitted interface as a result of the arbitrating.

3. The method according to claim 1, further comprising preserving the access granted to the one of the interfaces until an end of occupation of the access when no access request to the bus is received before the end of the occupation of the access.

4. The method according to claim 1, wherein the minimum counting period is configurable and corresponds to the one of the interfaces.

5. The method according to claim 1, wherein the interfaces comprise serial peripheral interfaces.

6. The method according to claim 5, wherein the serial peripheral interfaces comprise at least one octal type serial peripheral interface.

7. The method according to claim 1, in which the bus is an input-output data bus.

8. The method of claim 1, further comprising:
    asserting a first acknowledge signal provided to the one of the interfaces when the access to the bus is granted to the one of the interfaces; and
    de-asserting the first acknowledge signal before the end of the minimum counting period.

9. The method of claim 1, wherein the steps of triggering the counting, releasing the access, creating the arbitration point, and granting access is performed by a controller.

10. An electronic device, comprising:
    interfaces, wherein each interface of the interfaces comprises a counter;
    a bus shared by the interfaces; and
    a controller configured to
        when access to the bus is granted to one of the interfaces, trigger a counting having a minimum counting period;
        when at least one access request to the bus emanating from at least one other of the interfaces is received during the minimum counting period, release the access granted to the one of the interfaces, and create an arbitration point at an end of the minimum counting period; and
        when no access request is received during the minimum counting period and when a late access request is first received following the minimum counting period,
            release the access granted to the one of the interfaces, and
            grant access to the bus for the at least one other of the interfaces following the late access request to the bus emanating from the at least one other interface, wherein the access granted to the one of the interfaces is uninterrupted from before the end of the minimum counting period to the granting of the access for the at least one other of the interfaces following the late access request to the bus.

11. The device according to claim 10, wherein the controller is further configured to:
    at the arbitration point, arbitrate access to the bus for the at least one other of the interfaces to determine a permitted interface, and
    granting access to the bus for the permitted interface as a result of the arbitrating.

12. The device according to claim 10, wherein the controller is further configured to maintain the access granted to the one of the interfaces until an end of occupation of the access when no access request to the bus is received before the end of the occupation of the access.

13. The device according to claim 10, wherein the minimum counting period is configurable and corresponds to one of the interfaces.

14. The device according to claim 10, wherein the interfaces comprise serial peripheral interfaces.

15. The device according to claim 14, in which the serial peripheral interfaces comprise at least one octal type serial peripheral interface.

16. The device according to claim 14, wherein the bus is an input-output data bus.

17. An electronic apparatus comprising:
- a plurality of interface circuits;
- a bus coupled to each of the plurality of interface circuits;
- a controller coupled to the bus and to the plurality of interface circuits; and
- a multiplexer coupled to the controller via the bus, wherein the controller is configured to
  - activate a first timer for a minimum timer period when access to the bus is granted to a first interface circuit of the plurality of interface circuits, and
  - when at least one access request for the bus is received from a second interface circuit of the plurality of interface circuits during the minimum timer period, release the access granted to the first interface circuit and grant access to the second interface circuit, at an end of the minimum timer period, and
  - when no access request is received during the minimum timer period and when a late access request is first received following the minimum timer period,
    - release the access granted to the first interface circuit, and
    - grant access to the bus for the second interface circuit following the late access request to the bus emanating from the second interface circuit, wherein the access granted to the first interface circuit is uninterrupted from before the end of the minimum timer period to the granting of the access for the second interface circuit following the late access request to the bus.

18. The electronic apparatus according to claim 17, wherein the multiplexer comprises a set of input-output pins configured to couple the bus to a plurality of external memories.

19. The electronic apparatus according to claim 17, wherein:
- the multiplexer comprises a same number of sets of input-output pins as a number of interface circuits of the plurality of interface circuits; and
- each set of input-output pins is configured to be coupled to an external memory.

20. The electronic apparatus according claim 17, wherein the plurality of interface circuits, the bus, the controller and the multiplexer form a system on chip.

* * * * *